(12) United States Patent
Solf et al.

(10) Patent No.: US 11,846,735 B2
(45) Date of Patent: Dec. 19, 2023

(54) SUB-PIXEL TIME SKEW CORRECTION FOR POSITRON EMISSION TOMOGRAPHY (PET)

(71) Applicant: KONINKLIJKE PHILIPS N.V., Eindhoven (NL)

(72) Inventors: Torsten Solf, Aachen (DE); Thomas Frach, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/782,693

(22) PCT Filed: Nov. 30, 2020

(86) PCT No.: PCT/EP2020/083883
§ 371 (c)(1),
(2) Date: Jun. 6, 2022

(87) PCT Pub. No.: WO2021/110584
PCT Pub. Date: Jun. 10, 2021

(65) Prior Publication Data
US 2022/0342089 A1 Oct. 27, 2022

(30) Foreign Application Priority Data
Dec. 6, 2019 (EP) .................................. 19214127

(51) Int. Cl.
*G01T 1/164* (2006.01)
(52) U.S. Cl.
CPC .......... *G01T 1/1648* (2013.01); *G01T 1/1642* (2013.01); *G01T 1/1647* (2013.01)
(58) Field of Classification Search
CPC .... G01T 1/1648; G01T 1/1642; G01T 1/1647
See application file for complete search history.

(56) References Cited

U.S. PATENT DOCUMENTS 7,132,664 B1 * 11/2006 Crosetto ............... G01T 1/1612
250/369
9,354,332 B2 5/2016 Zwaans
(Continued)

OTHER PUBLICATIONS

International Search Report and Written Opinion of PCT/EP2020/083883, dated Feb. 12, 2021.
(Continued)

*Primary Examiner* — David P Porta
*Assistant Examiner* — Fani Polyzos Boosalis

(57) ABSTRACT

The present invention relates to a calibration method for a gamma ray detector (100) including a pixelated scintillator array (110) for emitting scintillation photons at photo conversion positions (94) in response to incident gamma rays (90), and a pixelated photodetector array (120) for determining a spatial intensity distribution of the scintillation photons. The present invention bases on the idea that using the concept of optical light sharing of scintillation photons, which are emitted in one element, i.e., one scintillator pixel (112) of the scintillator array (110) and distributed over multiple photodetector pixels (122) of the pixelated photodetector army (120), allows obtaining an estimate for the time skew between adjacent photodetector pixels (122). The present invention further relates to a calibration module (200) for a gamma ray detector (100) including a recorder (210) and a processing module (220) for performing the function of the above-explained method. Still further, the present invention relates to a gamma my detector (100) as well as to a medical imaging device (50) comprising this gamma my detector (100).

20 Claims, 13 Drawing Sheets

(56) References Cited

U.S. PATENT DOCUMENTS

| | | |
|---|---|---|
| 9,606,245 B1* | 3/2017 | Czarnecki .............. G01T 1/208 |
| 2007/0270693 A1 | 11/2007 | Fiedler |
| 2011/0291017 A1 | 12/2011 | Frach |
| 2014/0021356 A1 | 1/2014 | Zwaans |
| 2016/0187497 A1 | 6/2016 | Lerche |
| 2016/0245934 A1 | 8/2016 | Shahar |
| 2016/0266260 A1 | 9/2016 | Preston |
| 2016/0299240 A1 | 10/2016 | Cho |
| 2016/0371419 A1 | 12/2016 | Dolinsky |
| 2017/0322324 A1 | 11/2017 | Fu |

OTHER PUBLICATIONS

Yeom, Jung Yeol et al "Side Readout of Long Scintillation Crystal Elements with Digital SiPM for TOF-DOI PET", Medical Physics, vol. 41, No. 12, Dec. 2014, p. 122501-1-122501-9.

Marcinkowski, R. et al "Optimized Light Sharing for High-Resolution TOF PET Detector based on Digital Silicon Photomultipliers", Physics in Medicine & Biology, vol. 59, 2014, pp. 7125-7139.

\* cited by examiner

US 11,846,735 B2

SUB-PIXEL TIME SKEW CORRECTION FOR POSITRON EMISSION TOMOGRAPHY (PET)

CROSS-REFERENCE TO PRIOR APPLICATIONS

This application is the U S. National Phase application under 35 U.S.C. § 371 of International Application No PCT/EP2020/083883, filed on Nov. 30, 2020, which claims the benefit of European Patent Application No 19214127.3, filed on Dec. 6, 2019. These entire disclosures of International Application No. PCT/EP2020/083883, and European Patent Application No. 19214127.3 are specifically hereby incorporated by reference herein.

FIELD OF THE INVENTION

The present invention relates to a calibration method for a gamma ray detector, to a corresponding calibration module for a gamma ray detector, to a gamma ray detector and to a medical imaging device.

BACKGROUND OF THE INVENTION

Positron emission tomography (PET) is a commonly used medical imaging technique. Said technique is based on the detection of gamma ray photons that are emitted after a radioactive tracer substance is administered to a patient, for example by injecting it into a peripheral vein. A nucleus of a radioisotope of the radioactive tracer substance emits a positron (positive electron), which collides with an electron in the tissue of the patient. This process converts mass to energy in the form of two emitted gamma ray photons. These two gamma ray photons are oppositely directed and detected by radiation detectors surrounding the imaging subject (patient) as to substantially simultaneous radiation detection events that define a line of response (LOR) therebetween.

A disadvantage of conventional PET is that it is not possible to pin down the exact location of the annihilation event, which reduces the resolution of the constructed image of the patient. In time-of-flight (TOF) PET, the small time difference (or lack thereof) between the two substantially simultaneous detection events is used to further localize the positron along the LOR. The concept of TOF simply means in said context that for each electron-positron annihilation event, the precise time for which each of the coincident photons is detected is rioted to calculate the time difference. Since the closer photon will arrive at its detector first, the difference in arrival time helps to pin down the location of the annihilation event along the LOR more precisely. To provide a very precise localization, the gamma rays should be detected with sub-nanosecond temporal resolution. However, spatial variation of the intrinsic time delays across the detector arrays typically used for PET applications, also called "skew", can produce substantial errors if they are not corrected.

Conventional gamma ray detectors usually comprise a scintillation detector or a scintillator, e.g., a scintillator crystal or an array of scintillators, coupled to a photodetector, e.g., an array of photosensitive elements. The scintillator scintillates, i.e., emits light flashes in response to incoming particles such as high-energy gamma photons or positrons. The emitted photons are captured by the photodetector, which, in turn, is read out by dedicated read-out electronics based on where and when scintillation photons are captured. The temporal and spatial position of the incident gamma photons in the scintillator may be determined. In said context, the skews are individual fingerprints for these detectors, which depend on the intrinsic properties of the scintillator crystals and their fabrication, but additionally depend on external factors, like supply voltage and temperature changes. Further, major contributions to said skews result from the electronic channels connected to the array of photosensitive elements. The wave impedance and the cable lengths lead to time delays and the clock distribution along the various channels cannot be realized without additional buffers having respective individual time delays.

Even though TOF PET is able to reduce acquisition time and to increase effective sensitivity for PET acquisitions by calculating the time difference of two coincident photons, for systems with timing resolutions of 200 ps (FWHM) in coincidence, uncorrected time skews of 20 ps to 40 ps can deteriorate system performance.

Thus, there is a demand for time skew correction for TOF PET applications in order to provide more accurate medical imaging devices, such as PET/CT or PET/MR, with improved temporal resolutions.

US 2016/0187497 A1 discloses a calibration method, which bases on determining sets of coincidentally emitted scintillation photons from a recorded spatial intensity distribution of scintillation photons emitted by a scintillator array, determining for the sets of coincidentally emitted scintillation photons center-of-gravity positions and cumulative energies and performing a clustering analysis based on the determined center-of-gravity positions and cumulative energies. An improved resolution when used for imaging is achieved.

SUMMARY OF THE INVENTION

It is an object of the present invention to provide an alternative calibration method and a calibration module for a gamma ray detector to provide a fast and accurate calibration of the same. It is further an object of the present invention to provide a gamma ray detector, a medical imaging device and a computer program.

In a first aspect of the present invention a calibration method for a gamma ray detector is presented that comprises
   a pixelated scintillator array having multiple scintillator pixels for emitting scintillation photons at photo conversion positions in response to incident gamma rays, and
   a pixelated photodetector, PD, array having multiple PD pixels coupled to the pixelated scintillator array for determining a spatial intensity distribution of the scintillation photons,
   wherein the PD pixels are subdivided into multiple PD sub-pixels, the calibration method comprising the steps of
   enabling a first PD sub-pixel which is coupled to a first scintillator pixel of the pixelated scintillator array,
   enabling a second PD pixel which is coupled to a second scintillator pixel of the pixelated scintillator array, wherein the enabled second PD pixel is located adjacent to a PD pixel to which the enabled first PD sub-pixel belongs,
   recording scintillation photons, emitted at a photo conversion position located in the first scintillator pixel, by the enabled first PD sub-pixel to obtain a first PD sub-pixel detection signal at a first time point,
   recording shared scintillation photons, resulting from the photo conversion in the first scintillator pixel and travelled into the second scintillator pixel, by the enabled second PD pixel to obtain a second PD pixel detection signal at a second time point, estimating a first time skew between the first time point and the second time point, and correcting the first time skew.

In a further aspect of the present invention a calibration module for a gamma ray detector is presented that comprises a pixelated scintillator array having multiple scintillator pixels configured to emit scintillation photons at photo conversion positions in response to incident gamma rays, a pixelated PD array having multiple PD pixels coupled to the pixelated scintillator array and configured to determine a spatial intensity distribution of the scintillation photons, wherein the PD pixels are subdivided into multiple PD sub-pixels, the calibration module comprising:

a recorder configured to record scintillation photons, emitted at a photo conversion position in a first scintillator pixel of the pixelated scintillator array, by an enabled first PD sub-pixel which is coupled to the first scintillator pixel, to obtain a first PD sub-pixel detection signal at a first time point, and record shared scintillation photons, resulting from the photo conversion in the first scintillator pixel and travelled into a second scintillator pixel of the pixelated scintillator array, by an enabled second PD pixel which is coupled to the second scintillator pixel and located adjacent to a PD pixel to which the enabled first PD sub-pixel belongs to obtain a second PD pixel detection signal at a second time point, and a processing module configured to estimate a first time skew between the first time point and the second time point, and correct the first time skew.

In another aspect of the present invention there is presented a gamma ray detector comprising a pixelated scintillator array having multiple scintillator pixels configured to emit scintillation photons at photo conversion positions in response to incident gamma rays, a pixelated PD array having multiple PD pixels coupled to the pixelated scintillator array and configured to determine a spatial intensity distribution of the scintillation photons, wherein the PD pixels are subdivided into multiple PD subpixels, and a calibration module according to the above-described aspect of the present invention.

In yet another aspect of the present invention there is presented a medical imaging device comprising a gamma ray detector as disclosed herein. In yet further aspects of the present invention, there are provided a computer program which comprises program code means for causing a calibration, a gamma ray detector or a medical imaging device according to the above-described aspect to perform the steps of the calibration method disclosed herein when said computer program is carried out on a processor of the calibration module, on a processor of the gamma ray detector or on a processor of the medical imaging device. In yet another aspect of the present invention, a non-transitory computer-readable recording medium is presented that stores therein a computer program product, which, when executed by a processor, causes the calibration method disclosed herein to be performed.

Preferred embodiments of the invention are defined in the dependent claims. It shall be understood that the claimed calibration module, gamma ray detector, medical imaging device, computer program and medium have similar and/or identical preferred embodiments as the claimed calibration method and as defined in the dependent claims.

The present invention is based on the idea use the concept of light sharing between adjacent scintillator pixels, i.e., scintillator elements of the pixelated scintillator array, to estimate the coincidence timing and the skews, i.e., time skews, between them by exploiting their optical light sharing properties.

For said purpose, a gamma ray hits an array of scintillating pixels, i.e., a scintillator array, at a certain position, i.e., a photo conversion position, and causes the emission of a light flash, i.e., scintillation photons, in the scintillator. The PD array, which comprises photosensitive elements, is coupled to the scintillator array such that the scintillation photons emitted in one element of the scintillator array, i.e., one scintillator pixel, are distributed over multiple PD pixels of the pixelated PD array, i.e., light is shared between adjacent scintillator pixels and adjacent PD pixels. Preferably, each PD pixel is subdivided into multiple PD subpixels. The pixelated PD array allows recording a spatial intensity distribution of the emitted scintillation photons. The gamma absorption is at a photo conversion position located in a first scintillator pixel of the pixelated scintillator array. This first scintillator pixel is coupled to an enabled first PD sub-pixel of the pixelated PD array. Due to light sharing, a coincident event is generated and read out in the adjacent second PD pixel, which is coupled to a second scintillator pixel of the pixelated scintillator array.

Recording scintillation photons, emitted at the photo conversion position located in the first scintillator pixel, by the enabled first PD sub-pixel allows obtaining a first PD sub-pixel detection signal at a first time point. Recording shared scintillation photons, which result from the photo conversion in the first scintillator pixel and travelled into the second scintillator pixel, by an enabled second PD pixel, which is coupled to the second scintillator pixel, allows obtaining a second PD pixel detection signal at a second time point. Thus, two different detection signals (the first PD sub-pixel detection signal and the second PD pixel detection signal) are obtained at typically two slightly different time points and used for time skew estimation. The present invention thus proposes a calibration routine which is based on local light sharing between adjacent scintillator crystals.

In said context. "enabling" means that a respective PD pixel or PD sub-pixel is switched on (by a respective trigger as explained below). As each PD pixel is preferably subdivided into multiple PD pixels, a PD pixel is (fully) enabled if all PD sub-pixels of this PD pixel are enabled. Hence, the present invention bases on estimating the time skew between a detection event at an enabled first PD sub-pixel and a fully enabled second PD pixel, which is located adjacent to a (first) PD pixel to which the first PD sub-pixel belongs. In other words, the fully enabled PD pixel acts as a "reference PD pixel" for the PD sub-pixel. As the term "time skew" refers to the time difference between two channels (the PD sub-pixel channel and the reference PD pixel channel), it may also be called "time offset". However, the term "time offset" typically refers to any fixed reference. In the present context, the respective PD pixel acts as a reference for the respective PD sub-pixel, but is not a fixed reference in itself. Thus, the time difference between the channels is called "time skew" instead of "time offset".

Preferably, the step of correcting the first time skew comprises delaying the first PD sub-pixel detection signal and/or the second PD pixel detection signal to reduce said time skew. This means that the first PD sub-pixel detection signal is preferably delayed with respect to the second PD pixel detection signal or vice versa. In said context, the time skew is typically in a range of tens of picoseconds. Thus, precise electronic delay units are required. Such delay units can be realized by additional buffers, eventually in combination with RC components, and additional tracks like metal traces in silicon design, which also creates RC components.

According to another embodiment, the pixelated PD array is connected to a tunable delay unit array of tunable PD sub-pixel delay units and tunable PD pixel delay units. The calibration method may comprise the step of setting delay times for a first tunable PD sub-pixel delay unit connected to the first PD sub-pixel and for a second tunable PD pixel delay unit connected to the second PD pixel to correct the first time skew. Preferably, each PD pixel and each PD sub-pixel is connected to a tunable PD pixel delay unit and a tunable PD sub-pixel delay unit, respectively. Thus, the calibration method may also comprise the step of setting delay times for all tunable PD pixel delay units and all tunable PD sub-pixel delay units, respectively. The delay units may be any controllable delay unit known in the art of processing electrical signals and these delay units may be controlled by any kind of suitable processor. A precise delaying in the range of some picoseconds is achieved by these delay units.

As already mentioned above, the skew depends mainly on intrinsic properties of the scintillator pixels, which may depend on the fabrication process of said scintillator pixels. Apart from this, the skew may also depend on environmental data, such as the temperature, the supply voltage of the respective PD pixels and PD sub-pixels or the magnetic field if the gamma ray detector is operated in magnetic fields. It is known in the art that magnetic fields have an effect on PET image resolution.

To take these circumstances into account, the first time skew may also be corrected based on a time skew model which relates the environmental data with a time offset used for correcting the time skew. This is of particular interest for PET systems operated in magnetic fields or air cooled PET systems with a potential variation of over 10 K in temperature as this can lead to a large drift of the time skew (several of tens of ps). Hence, to improve timing performance notably, it is favorable to correct the time skew not only based on delaying a PD sub-pixel detection signal with respect to a PD pixel detection signal, but also on time skew models which are preferably based on a plurality of environmental data measured by one or more sensors. The calibration method thus comprises a direct correction of temperature shifts (and voltage drifts, etc.). The models may be either linear or non-linear models and may further be based on a reference table of environmental data and reference time skews.

Enabling one PD sub-pixel (i.e., the first PD sub-pixel) and one PD pixel (i.e., the second PD pixel) allows estimating only the time skew between them. In general, a pixelated PD array known in the art comprises many PD pixels, which are all preferably subdivided into multiple PD sub-pixels. Hence, it is not enough to only estimate the time skew between the first PD sub-pixel and the second PD pixel, but even more time skews to correct all of them.

For said purpose, the PD pixels are preferably connected to respective PD pixel triggers and the PD sub-pixels are preferably connected to respective PD sub-pixel triggers. The triggers are configured to enable or disable the respective PD pixels and PD sub-pixels.

According to an embodiment, the calibration method may further comprising the step of enabling several PD sub-pixels and several PD pixels by their respective PD sub-pixel triggers and PD pixel triggers to form a predetermined pattern of enabled and disabled PD sub-pixels and PD pixels. This allows obtaining a plurality of time skews between respective PD sub-pixels and respective PD pixels, which are then all used for the correction procedure as described above. The predetermined pattern may be programmed by applying a corresponding enable matrix to the PD pixel array. Preferably, each PD pixel is connected to a respective PD pixel trigger and each PD sub-pixel is connected to a respective PD sub-pixel trigger to enable or disable each PD pixel and PD sub-pixel individually. The predetermined pattern may further be changed within a few milliseconds if the patterns are stored in (or generated by) FPGAs connected to the PD pixel triggers and PD sub-pixel triggers.

Switching between several predetermined patterns of enabled of disabled PD sub-pixels and PD pixel allows resolving the light sharing between various different PD pixels and PD sub-pixels. Thus, a bunch of time skews may be estimated and used for the correction procedure discussed above. This further improves the calibration method and leads to smaller time skews of all PD sub-pixels of the gamma ray detector.

According to another embodiment, the calibration method further comprises the step of
  enabling a third PD pixel which is coupled to a third scintillator pixel of the pixelated scintillator array, wherein the enabled third PD pixel is located adjacent to the PD pixel to which the enabled first PD sub-pixel belongs,
  recording shared scintillation photons, resulting from the photo conversion in the first scintillator pixel and travelled into the third scintillator pixel, by the enabled third PD pixel to obtain a third PD pixel detection signal at a third time point,
  estimating a second time skew between the third time point and the first time point, and
  averaging the first time skew and the second time skew to obtain an averaged time skew.

This has the technical effect that not only one PD pixel (i.e., the second PD pixel) acts as a reference PD pixel for the first PD sub-pixel, but also another PD pixel (i.e., the third PD pixel). Thus, two (or even more) time skews can be estimated and averaged before being corrected. In said context, the second PD pixel and the third PD pixel are located adjacent to the (first) PD pixel to which the first PD sub-pixel belongs. The time skews may thus be averaged by using, e.g., a horizontal and vertical reference PD pixel. It may also be an option to correct the first time skew and the second time skew, respectively, before calculating an average of the respective corrected time skews.

According to an embodiment, the calibration method may further comprise the step of
  emitting incident gamma rays by a point source distanced from the gamma ray detector and/or by radioactive nuclides if the pixelated scintillator array comprises radioactive nuclides, wherein the scintillation photons are emitted at photo conversion positions in response to said incident gamma rays.

The advantage of using a point source, such as a Na-22 positron source, is that a large count statistics of photo conversions are obtained, which can speed up the calibration procedure. However, the calibration procedure does not need coincident events created by external positron emitters placed and adjusted in the Field of View (FOV) of the gamma ray detector. It is sufficient to calibrate the gamma ray detector with intrinsic self-emission if the scintillator array exhibits radioactive materials like Lu-176, which is commonly used for scintillators of gamma ray detectors. Another option is to use even cosmic gamma rays. The advantage of a background can (without an external point source) is that it can be performed without user intervention whenever the PET system is not actively recording patient data. Thus, the calibration method may preferably be executed several times a day between the medical examinations of patients in clinical settings.

According to an embodiment, the calibration method may further comprise the step of
- comparing the estimated first time skew, second time skew and/or averaged time skew to a reference table of time skews, and
- generating a warning if the estimated time skew is outside an acceptance window.

If the time skews of the gamma ray detector are too large, a precise medical imaging of a patient cannot be achieved. Thus, a warning may be generated to indicate the medical staff in clinical settings that the PET system might give wrong imaging results. This leads to an improved medical examination of patients, in particular if the calibration method is routinely executed to permanently control the functionality of the gamma ray detector.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
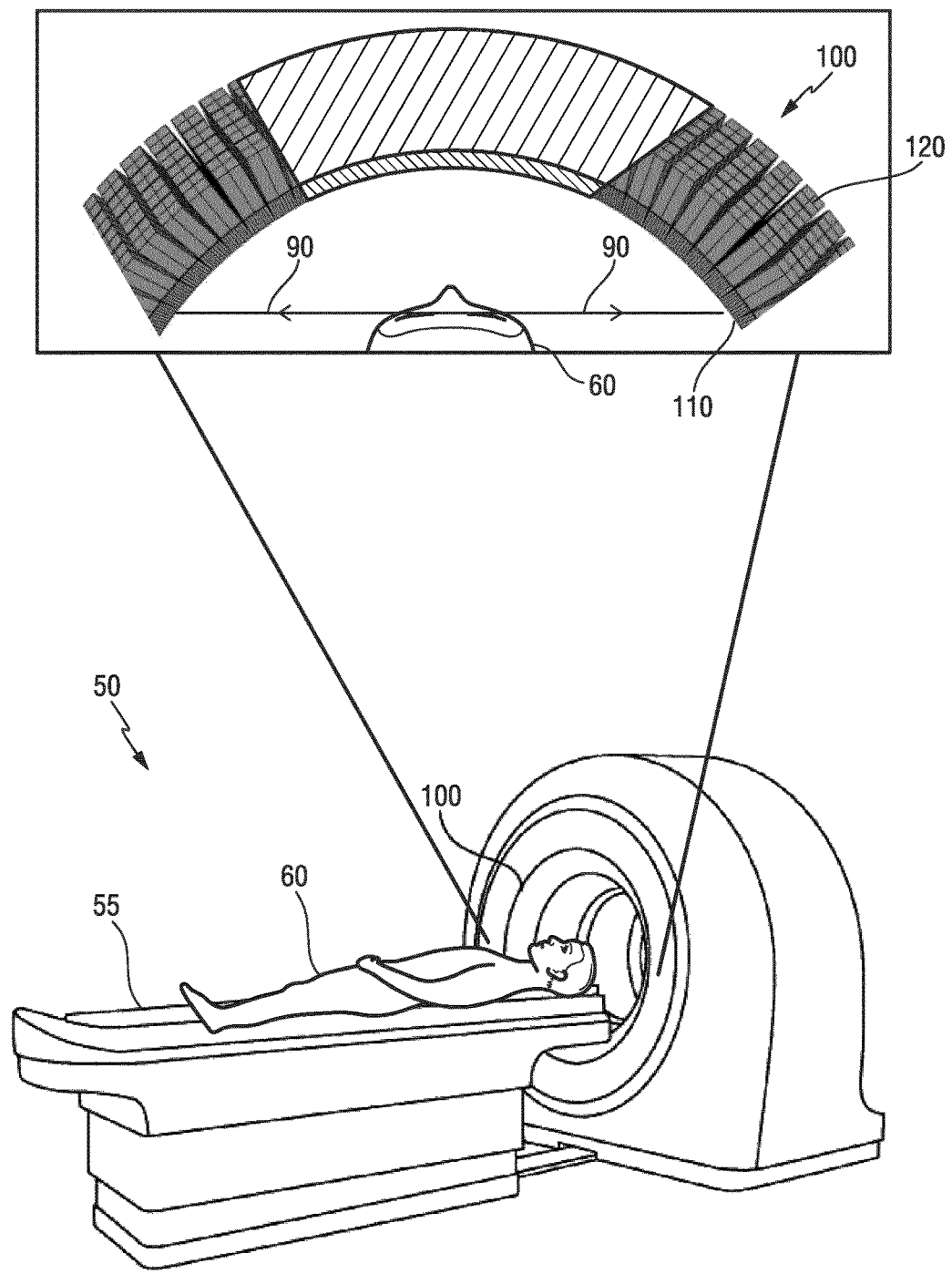
FIG. 1 shows a schematic diagram of a medical imaging device according to the present invention.

FIG. 1 shows a schematic diagram of a medical imaging device 50 according to the present invention. Said medical imaging device 50 may for example be a PET, PET/CT, PET/MR or SPECT/PET/CT device. The illustrated medical imaging device 50 comprises a gamma ray detector 100, which is preferably calibrated by making use of a calibration method or a calibration module according to the present invention.

The illustrated medical imaging device 50 further comprises an adjustable patient support 55 for supporting a patient 60 being subject to treatment, i.e., imaging, by means of the medical imaging device 50. PET devices usually detect particles and in particular gamma rays emitted within the patient 60 to be imaged. For instance, the patient 60 may be administered a radioactive tracer substance and the gamma ray detector 100 calibrated according to the present invention might be used to determine the spatial position of this tracer substance in the patient 60. Thereby PET devices usually comprise a gamma ray detector 100, which as shown in FIG. 1 comprises a ring and is used for detecting two simultaneously impinging gamma rays.

This is more clearly illustrated in the inlet of FIG. 1. This inlet shows a clipping of the gamma ray detector 100 and the head of the patient 60, in which a radioactive tracer substance is located after being administered to said patient 60. In PET imaging, the radio pharmaceutical administered to the patient 60 emits positrons, each of which in turn annihilates with an electron of the surrounding imaging subject in an electron-positron annihilation event to produce two oppositely directed 511 keV gamma rays 90. In conventional PET imaging these two oppositely directed gamma rays 90 are detected by gamma ray detectors 100 surrounding the imaging subject as to substantially simultaneous radiation detection events that define a line of response (LOR) therebetween. In time-of-flight (TOF) PET, the small time difference (or lack thereof) between the two substantially simultaneous detection events is used to further localize the positron along the LOR. Since the closer photon will arrive at its detector first, the difference in arrival times helps to locate the annihilation event along the LOR more precisely in comparison to PET without time-of-flight applications.

The inlet in FIG. 1 further illustrates that the gamma ray detector 100 comprises a pixelated scintillator array 110 having multiple scintillator pixels for emitting scintillation photons at photo conversion positions in response to the incident gamma rays 90. Still further, the gamma ray detector 100 comprises a pixelated photodetector, PD, array 120 having multiple PD pixels coupled to the pixelated scintillator array 110 for determining a spatial intensity distribution of the scintillation photons. The photodetector pixels may be photomultiplier tubes or silicon avalanche photo diodes (SPADs).

Even though current TOF PET approaches are found to provide sufficient (e.g., sub-nanosecond) temporal resolution for a given radiation detector pixel at the given time, a spatial variation across the detector array, also called "skew", can produce substantial errors. The skews are individual intrinsic fingerprints of the scintillator pixels of the pixelated scintillator array 110, but additionally depend on external factors, like supply voltage and temperature changes. This can substantially degrade the effective temporal resolution of the PET detector array.

The following figures explain how to overcome the aforementioned limitations by a fast and efficient calibration process to identify and correct PD sub-pixel skews of the pixelated photodetector array.

Figure 2:
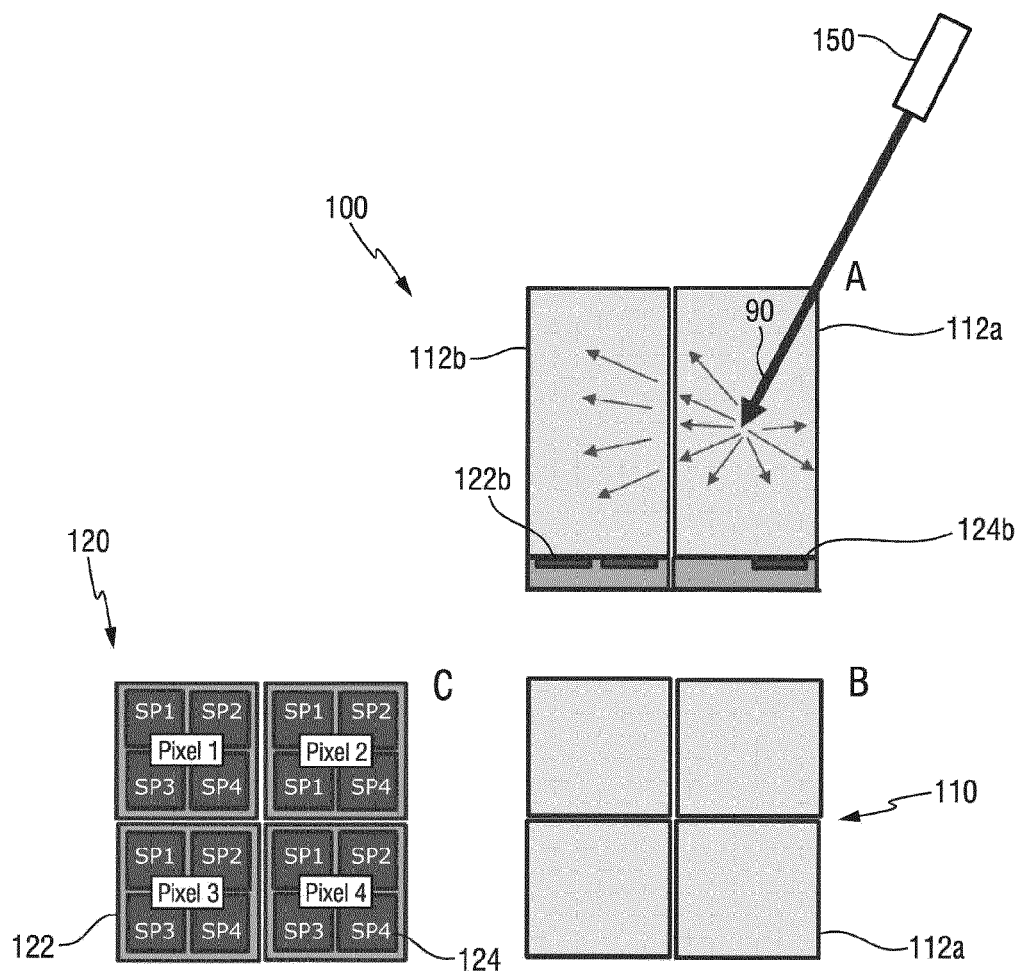
FIG. 2 shows a schematic diagram of a gamma ray detector according to the present invention.

FIG. 2 shows a schematic diagram of a gamma ray detector 100 according to the present invention FIG. 2A shows a schematic diagram of a side view on said gamma ray detector 100. The gamma ray detector 100 comprises a pixelated scintillator array 100 having multiple scintillator pixels 112. This is clearly illustrated in FIG. 2B which shows a schematic diagram of a top view of the pixelated scintillator array 110. The gamma ray detector 100 further comprises a pixelated PD array 120 having multiple PD pixels 122. FIG. 2C shows a schematic diagram of a top view on said pixelated PD array 120. Each PD pixel may be subdivided into four respective PD sub-pixels. However, it shall be understood that this is only exemplarily; it is an option to subdivide a PD pixel into more or less PD sub-pixels.

It can be seen in FIG. 2A that the PD pixels 122 of the pixelated PD array 120 are coupled to the pixelated scintillator array 110. The coupling may be achieved by any technique known in the art, in particular by a coupling based on a glue layer (not shown), between the pixelated scintillator array 110 and the pixelated PD array 120, in particular light conductive glue. The coupling allows determining a spatial intensity distribution of scintillation photons emitted at photo conversion positions 94 in the multiple scintillator pixels 112 in response to incident gamma rays 90.

The calibration method according to the present invention may comprise the step of emitting incident gamma rays 90 by a point source 150 (such as a Na-22 positron source) distanced from the gamma ray detector 100 and/or by radioactive nuclides if the pixelated scintillator array 100 comprises radioactive nuclides, such as lutetium (Lu-176) Thus, for a calibration procedure with a point source 150 the point source may be placed in the middle of the gamma ray detector 100 (cf. FIG. 2), where the patient is located during the medical imaging. An advantage of performing the calibration procedure with radioactive scintillator materials such as Lu-176 is that no external point source 150 has to be placed and adjusted for the calibration procedure.

The calibration method according to the present invention comprises the steps of enabling a first PD sub-pixel 124a which is coupled to the first scintillator pixel 112a of the pixelated scintillator array 110. Further, it comprises the step of enabling a second PD pixel 122b which is coupled to a second scintillator pixel 112b of the pixelated scintillator array 110, wherein the enabled second PD pixel 122b is located adjacent to a PD pixel to which the enabled first PD sub-pixel 124a belongs. The expression "adjacent" means in said context that these PD pixels are located next to each other in the plane of the pixelated PD arras 12o. It should be noted that only the enabled (switched on) PD pixels and PD sub-pixels are illustrated in FIG. 2A for simplification.

The photo conversion in the first scintillator pixel 112a does not only lead to scintillation photons which are detected by the enabled first PD sub-pixel 124a, but also to shared scintillation photons travelled into the second scintillator pixel 112b These shared scintillation photons are then detected by the fully enabled second PD pixel 122b to obtain a second PD pixel detection signal while a first PD sub-pixel detection signal is obtained from the scintillation photons recorded by the enabled first PD sub-pixel 124a. It should be noted that "fully enabled" means in said context that the second PD pixel 122b, which is subdivided into four PD sub-pixels (cf. FIG. 2C), is completely enabled, i.e., all four PD sub-pixels of the second PD pixel are enabled.

Still further, the calibration method comprises the step of estimating a first time skew between a first time point at which the first PD sub-pixel detection signal is obtained and a second time point at which the second PD pixel detection signal is obtained. This first time skew results from the "skew" mentioned above. Thus, the intrinsic fingerprint properties of the first scintillator pixel 112a and the second scintillator pixel 112b lead to different time points at which the scintillation photons are detected by the enabled first PD sub-pixel 124a and by the enabled second PD pixel 122b. This time skew is problematic for TOF PET, where a high temporal resolution is needed to pin down the location of the annihilation event along the LOR (cf. FIG. 1 for further explanations). For said purpose, the calibration method further comprises the step of correcting the first time skew. This allows reducing the time skew, i.e., the time difference between the first time point and the second time point.

Figure 3:
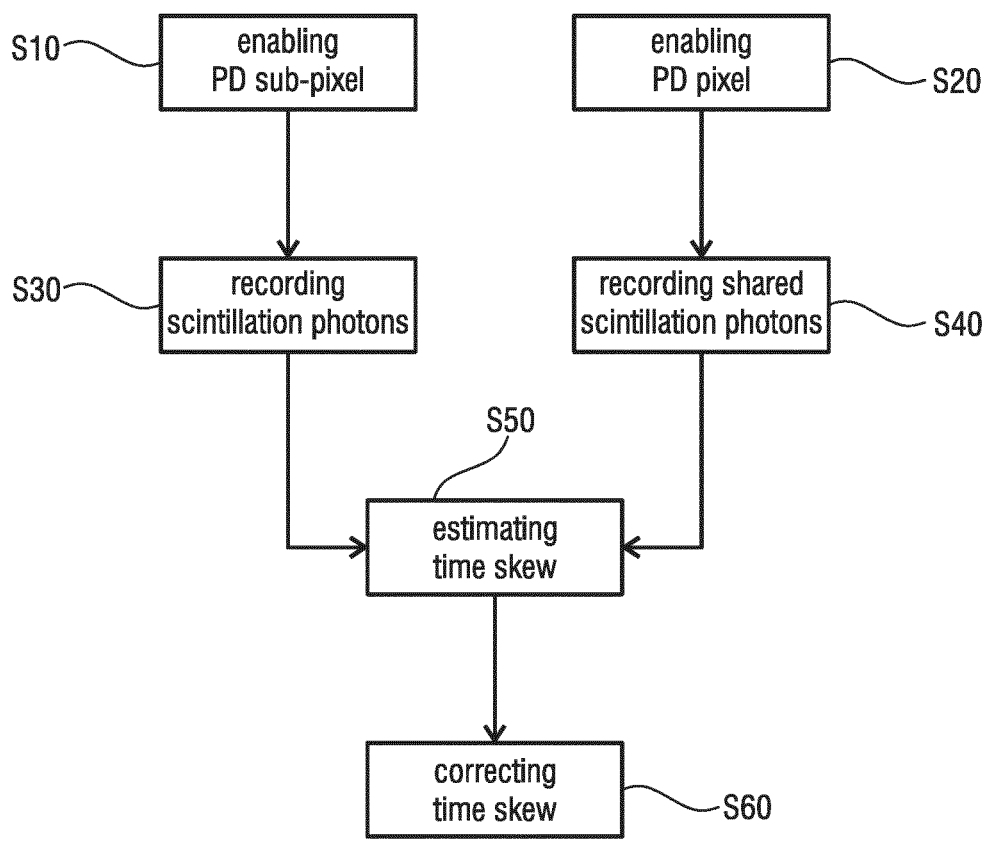
FIG. 3 shows a flowchart illustrating a calibration method according to the present invention.

FIG. 3 shows a flowchart illustrating said discussed calibration method. In a step S10, the enabled first PD sub-pixel 124a, which is coupled to the first scintillator pixel 112a of the pixelated scintillator array 110, is enabled. In a step S20, the second PD pixel 122b, which is coupled to the second scintillator pixel 112b of the pixelated scintillator array, is enabled, wherein the enabled second PD pixel 122b is located adjacent to a PD pixel to which the enabled first PD sub-pixel 124a belongs (cf. also FIG. 2). In a step S30, scintillation photons, which are emitted at a photo conversion position 94 located in the first scintillator pixel 112a, are recorded by the enabled first PD sub-pixel 124a to obtain a first PD sub-pixel detection signal. In step S40, shared scintillation photons, which result from the photo conversion in the first scintillator pixel 112a and which are travelled into the second scintillator pixel 112b, are recorded by the enabled second PD pixel 122b to obtain a second PD pixel detection signal. In a step S50, the first time skew of the recorded photons of the enabled first PD sub-pixel 124a to the recorded photons of the enabled second PD pixel 122b are estimated as the time skew between the first time point at which the first PD sub-pixel detection signal is obtained/derived and the second time point at which the second PD pixel detection signal is obtained/derived. In step S60, said first time skew is corrected to reduce the time skew (time offset) between these signals. A more detailed explanation of this step S60 is given below with reference to FIG. 5.

Hence, in general, the light sharing to adjacent scintillator pixels is a fundamental feature of the present invention, because it allow s estimating the coincidence timing resolution and the skews between them just by exploiting their optical light sharing properties. For this reason, the light sharing to adjacent scintillation crystals should preferably not be lower than 10% to guarantee suitable timing correlation values.

Figure 4:
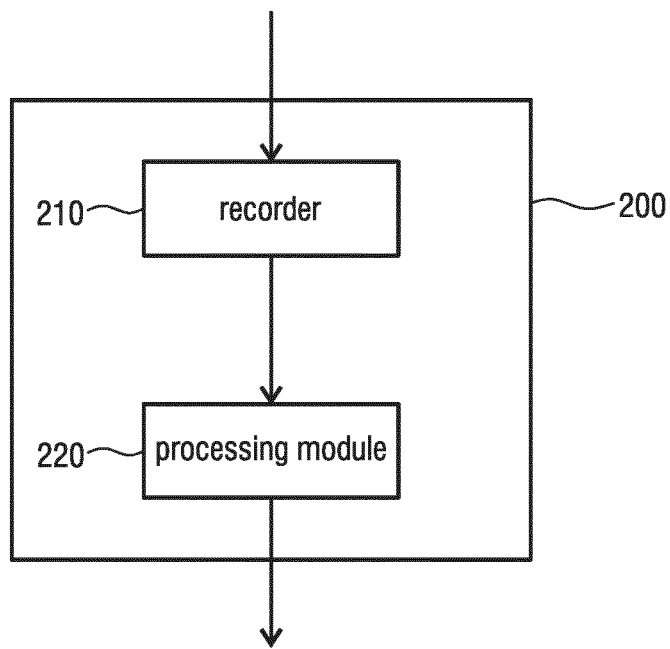
FIG. 4 shows a schematic diagram of a calibration module according to the present invention.

FIG. 4 shows a schematic diagram of a calibration module for a gamma ray detector according to the present invention. The gamma ray detector is preferably the same as already discussed with reference to FIG. 2 and thus comprises a pixelated scintillator array having multiple scintillator pixels configured to emit scintillation photons at photo conversion positions in response to incident gamma rays. The gamma ray detector preferably further comprises a pixelated PD array having multiple PD pixels coupled to said pixelated scintillator array and configured to determine a spatial intensity distribution of the scintillation photons, wherein the PD pixels are subdivided into multiple PD sub-pixels (e.g., four PD sub-pixels, respectively).

The calibration module as illustrated in FIG. 4 comprises a recorder 210 and a processing module 220. The recorder 210 records scintillation photons, emitted at a photo conversion position in a first scintillator pixel of the pixelated scintillator array, by an enabled first PD sub-pixel, which is coupled to the first scintillator pixel, to obtain a first PD sub-pixel detection signal at a first time point. Further, the recorder records shared scintillation photons, resulting from the photo conversion in the first scintillator pixel and travelled into a second scintillator pixel of the pixelated scintillator array, by an enabled second PD pixel which is coupled to the second scintillator pixel and located adjacent to a PD pixel to which the enabled first PD sub-pixel belongs to obtain a second PD pixel detection signal at a second time point. Based on the detection signals, the processing module 220 estimates a first time skew between the first time point and the second time point, and corrects said first time skew.

Figure 5:
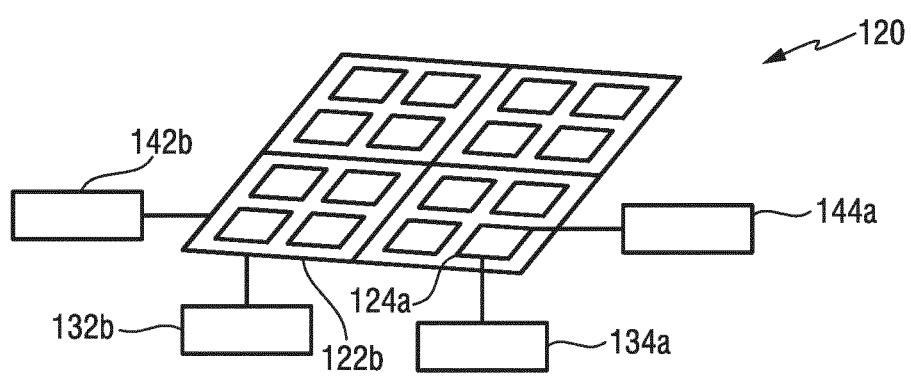
FIG. 5 shows a schematic diagram of an electric connection of the PD pixel array to delay units and triggers.

FIG. 5 shows a schematic diagram of an electric connection of the pixelated PD pixel array 120 to delay units and triggers. As already explained with reference to FIGS. 2-4, a first PD sub-pixel 124a and a second PD pixel 122b are enabled. Thus, the enabled first PD sub-pixel 124a may be electrically connected to a first PD sub-pixel trigger 144a and the second PD pixel 122b may be connected to a second PD pixel trigger 142b. It shall be understood that the illustration shown in FIG. 5, where only one PD sub-pixel is connected to a PD sub-pixel trigger and only one PD pixel is connected to a PD pixel trigger is only exemplarily. Preferably, all PD pixels and PD sub-pixels of the pixelated PD array are connected to respective PD pixel triggers or PD sub-pixel triggers, which are each configured to enable and disable the respective PD pixels and PD sub-pixels.

It is further exemplarily shown in FIG. 5 that the first PD sub-pixel 124a may be electrically connected to a first tunable PD delay unit 134a and the second PD pixel 122b may be electrically connected to a second tunable PD delay unit 132b. It shall be understood that the illustration shown in FIG. 5 is only illustrative as well as that all PD pixels and PD sub-pixels are preferably each connected to respective delay units.

The step of correcting the first time skew may comprise delaying the first PD sub-pixel detection signal and/or the second PD detection signal to reduce the first time skew. This may be done by setting delay times for the first tunable PD sub-pixel delay unit 134a connected to the first PD sub-pixel 124a and for the second tunable PD pixel delay unit 132b connected to the second PD pixel 122b.

All methods and procedures discussed so far with reference to FIGS. 1-5 base on the assumption that one PD pixel is partly enabled (with only one out of four PD sub-pixels being enabled) and that an adjacent PD pixel to said PD pixel is fully enabled (with all four PD sub-pixels being enabled). It shall be understood that this is the smallest possible number of enabled PD pixels and enabled PD sub-pixels to explain the fundamental feature of the present invention of light sharing to adjacent PD pixels. In general, more than one PD sub-pixel are enabled as explained in the following with reference to FIG. 6.

Figure 6:
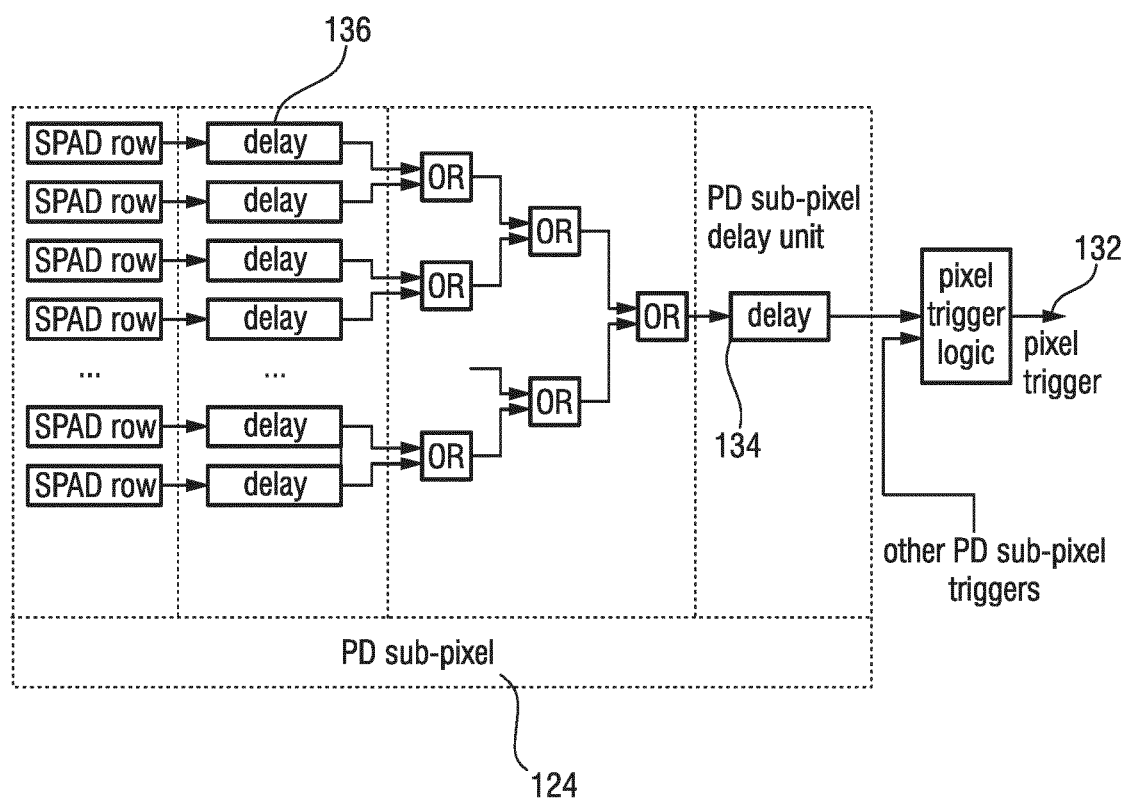
FIG. 6 shows a block diagram illustrating a programmable time delay of one PD pixel subdivided into several PD sub-pixels.

FIG. 6 shows a block diagram illustrating a programmable time delay of one PD pixel subdivided into several PD sub-pixels. Each PD pixel is subdivided into multiple PD sub-pixels which, in turn, comprise multiple single-photon avalanche diodes (SPADs) as shown in the left column of FIG. 6. Hence, each PD sub-pixel preferably comprises an array of SPADs, where multiple SPADs in a row may form a SPAD row. SPAD row delay units 136 as well as the PD sub-pixel delay units 134 can preferably be controlled individually. The programmable delay units for the SPAD rows (left), for the PD sub-pixels (middle) and for the PD pixel (right) create a basis for multi-level time skew corrections of the PET gamma rat detector.

Figure 7:
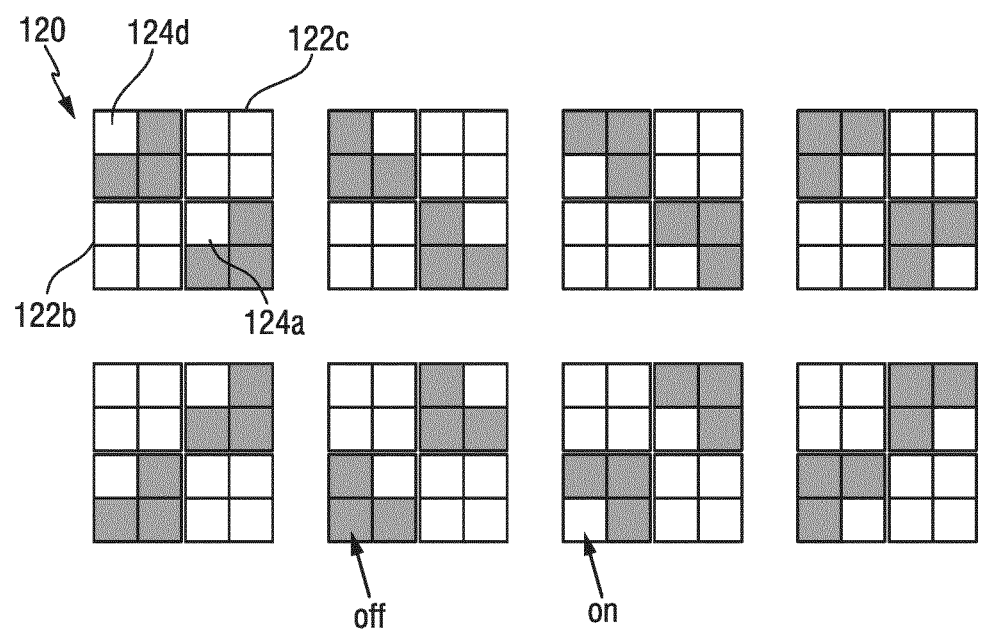
FIG. 7 shows a schematic diagram of a top view of eight different reference patterns of enabled and disabled PD pixels and PD sub-pixels.

FIG. 7 shows a schematic diagram of a top view of eight different reference patterns of enabled and disabled PD pixels and PD sub-pixels. These reference patterns can be used to estimate the individual PD sub-pixel time skews for an example matrix of a 2×2-pixelated scintillator array (not shown as out of the plane) and a pixelated PD array 120 of 4×4 PD sub-pixel areas. The coding indicates whether the individual PD pixel 122 or the individual PD sub-pixel 124 is enabled or disabled (bright=enabled/on; dark=disabled/off).

This is exemplarily explained with reference to the reference pattern on the top left, where the first PD sub-pixel 124a, which belongs to the PD pixel in the lower right, is enabled. Further, the second PD pixel 122b in the lower left is fully enabled (all four PD sub-pixels are enabled). This allows exemplarily estimating a first time skew, which is the time skew between the first time point at which a first PD sub-pixel detection signal (of the first PD sub-pixel 124a) is obtained, and a second time point at which a second PD pixel detection signal (of the second PD pixel 122b) is obtained. Thus, the reference pattern as shown in the upper left of FIG. 7 allows estimating the time skew of the first PD sub-pixel 124a with reference to the second PD pixel 122b, which thus acts a reference pixel.

Apart from this first PD sub-pixel 124a and the second PD pixel 122b, the reference pattern in the upper left further comprises an enabled third PD pixel 122c which is coupled to a third scintillator pixel 112c of the pixelated scintillator array 110 (not shown as out of the plane), wherein the enabled third PD pixel 122c is located adjacent to the PD pixel to which the enabled first PD sub-pixel 124a belongs. The calibration method as discussed with reference to the previous figures may further comprise the step of recording shared scintillation photons, which result from the photo conversion in the first scintillator pixel 112a and which travelled into the third scintillator pixel 112c, by the enabled third PD pixel 122c. This allows obtaining a third PD pixel detection signal at a third time point. Thus, a second time skew may be estimated as the time difference between the third time point and the first time point. This allows averaging the first time skew and the second time skew to obtain an averaged time skew. Hence, the time skew estimates for the first PD sub-pixel 124a are preferably averaged by using a horizontal and vertical reference (enabled second PD pixel 122b and enabled third PD pixel 122c), which are then the basis for time skew corrections.

To summarize, the reference pattern in the upper left of FIG. 7 allows estimating an averaged time skew for the first PD sub-pixel 124a. As another PD sub-pixel, namely a fourth PD sub-pixel 124d is also enabled in the reference pattern, said reference pattern does not only allow estimating the time skew for the first PD sub-pixel 124a, but also for the fourth PD sub-pixel 124d (by the same procedure as discussed above).

As further shown in FIG. 7, eight different patterns may be used to generate time skew estimates for horizontal and vertical neighbor PD pixels. The eight patterns may thus be used to extract 16 time skew estimates (one PD sub-pixel skew for every PD sub-pixel). As only the time skew difference of the four PD sub-pixels to a reference PD pixel is of interest, the mean-free horizontal and vertical estimates can be averaged. In addition, bad fits can be detected by applying corresponding limits for the maximum allowable difference.

The test patterns can be programmed by applying corresponding enable matrixes to the individual PD pixels and PD sub-pixels. The change can be realized within a few milliseconds if the test patterns are stored in (or generated by) local sensor tile FPGAs. It shall be understood that, in general, PD sub-pixels 124 can cover any fraction of a respective PD pixel 122.

Figure 8:
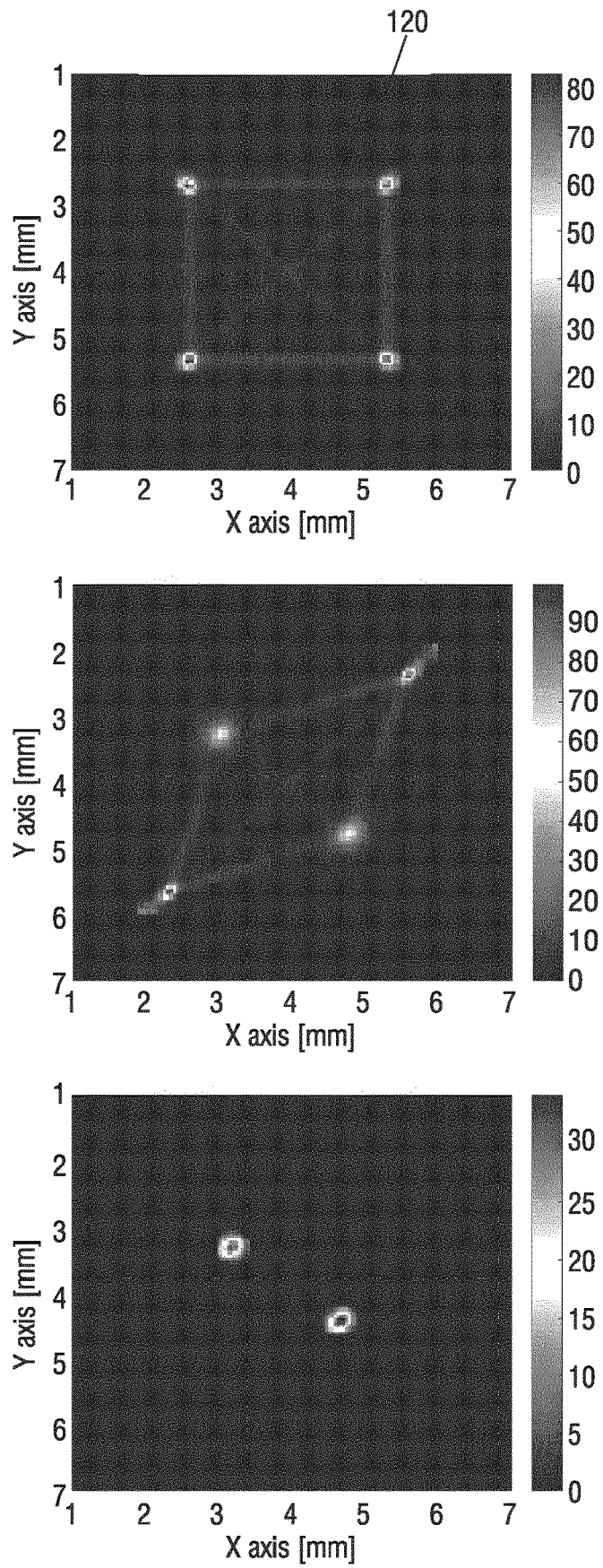
FIG. 8 shows diagrams of floodmaps of different enabled and disabled 2×2 PD pixel matrixes.

FIG. 8 shows diagrams of floodmaps of different enabled and disabled 2×2 PD pixel matrixes, where the square root of the counts are plotted to visualize the dynamic compression. The left diagram shows a floodmap where all four PD pixels are enabled. This configuration is used for normal PET operation. The diagram in the middle shows a floodmap of one of the eight test patterns shown in FIG. 7, where two of the four PD pixels are enabled only with ¼ of the area (here upper left and lower right). The distortion of the pixels in the middle diagram result from the lower detected intensity of these partly enabled PD pixels in comparison to the fully enabled PD pixels in the left floodmap. The right diagram shows a floodmap of the same test pattern as of the middle diagram with the difference that the events in the fully enabled PD pixels (upper right and lower left) are masked. Thus, only two regions of interest remain for the further PD sub-pixel skew estimation to only extract the events resulting from light sharing.

In general, the calibration procedure does not need coincident events created by positron emitters. It is sufficient to have "single" gammas, like from Lu-176 self-emission in case of a lutetium-based scintillator, but also by external single gamma emitters (Cs-137 with 661 keV), as well as cosmic gamma rays. The advantage of a background scan is that can be performed without user intervention whenever the PET scanner is not actively recording patient data. In addition, the data processing and updating of PD sub-pixels skew estimates can be realized decentral on sensor tile or module level by local FPGAs.

Figure 9:
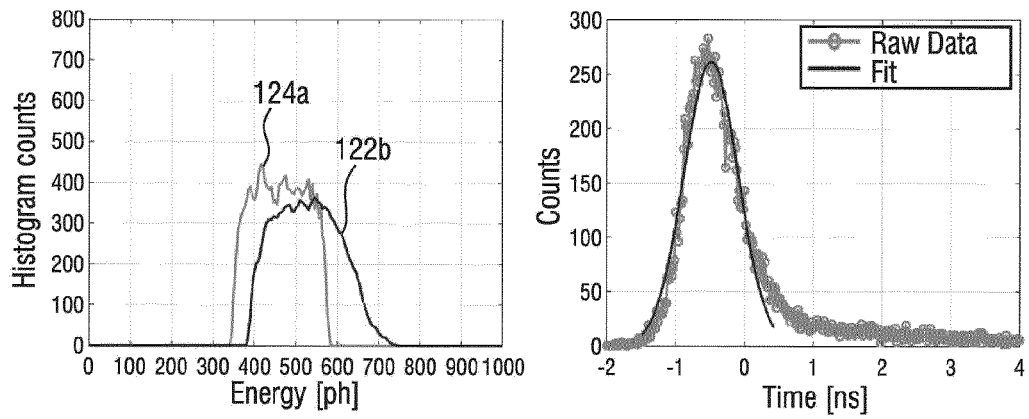
FIG. 9 shows an energy histogram and a timing histogram for a PD sub-pixel skew calibration with lutetium background scan.

FIG. 9 shows an energy histogram and a timing histogram for a sub-pixel skew calibration with lutetium background scan. The left diagram shows an energy histogram of a PD sub-pixel of interest (such as the first PD sub-pixel 124a in FIGS. 2 and 6) and the corresponding energy histogram due to light sharing on the adjacent fully enabled PD pixel (such as the second PD pixel 122b in FIGS. 2 and 6) The histogram of the PD sub-pixel is energy gated as only a suitable fraction of the lutetium background spectrum is selected. The right diagram shows the corresponding timing histogram of the gamma events after energy cut, giving an estimate for the time skew of the PD sub-pixel to the reference pixel. It can be seen that a time skew of roughly −0.6 ns (−600 µs) is recorded.

Figure 10:
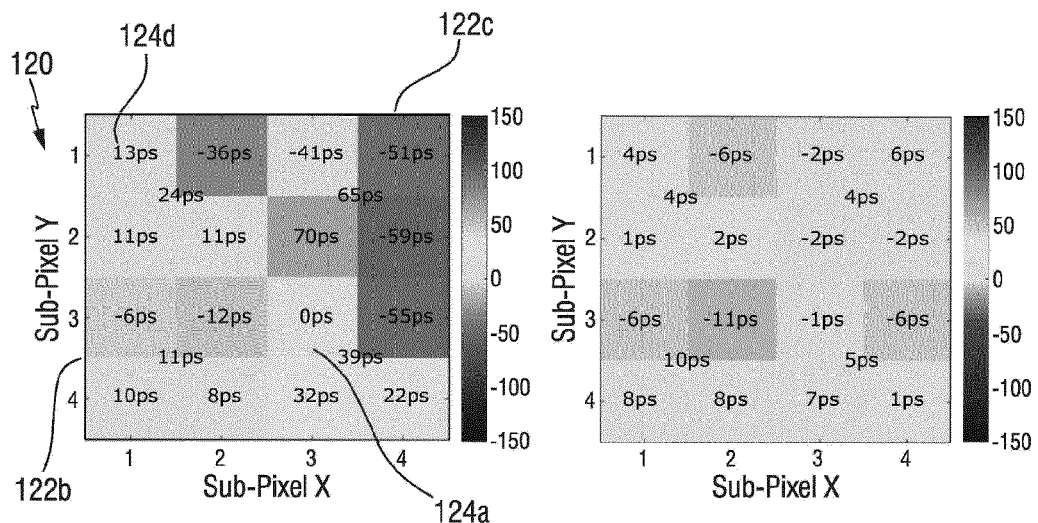
FIG. 10 shows color maps of PD sub-pixel time skews estimates from lutetium background scan for a 2×2 PD pixel matrix before (left) and after (right) correction.

FIG. 10 shows color maps of PD sub-pixel time skews estimates from lutetium background scan for a 2×2 PD pixel matrix before (left) and after correction (right). The values, such as "13 ps" for the fourth PD sub-pixel 124d represent the time skew of said PD sub-pixel to a reference PD pixel. Further, these time skew estimates are averaged by using a horizontal and vertical reference (such as the enabled third PD pixel 122e and the second PD pixel 122b for the fourth PD sub-pixel 124d) The values in the middle of a respective PD pixel, such as "11 ps" for the second PD pixel 122b, are the standard deviation obtained from averaging the respective time skews of all four PD sub-pixels of a respective PD pixel. Further, all four time skews of PD sub-pixels of a respective PD pixel cancel each other, i.e., the sum of four PD sub-pixel skews of a respective PD pixel is (almost) zero.

Figure 11:
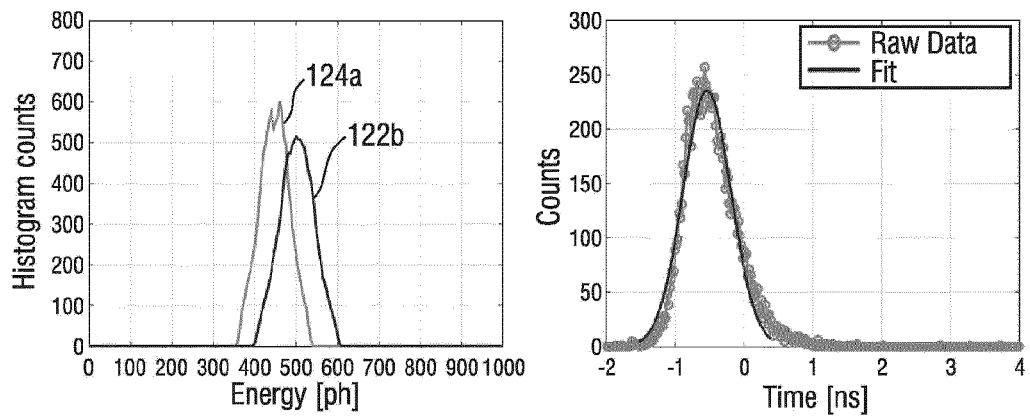
FIG. 11 shows an energy histogram and a timing histogram for a PD sub-pixel skew calibration with a Na-22 point source in singles mode.

FIG. 11 shows an energy histogram and a timing histogram for a PD sub-pixel skew calibration with a Na-22 point source in singles mode. In said context, "singles mode" means that only one single gamma photon is emitted. The following example shows that the PD sub-pixel and PD pixel skews can also be estimated with a decentral single processing on tile level by a reference point source. This has the advantage that the calibration process can be speed up due to higher count statistics, but one the other hand, as already mentioned above, requires manual work for the placement of the gamma point source.

Figure 12:
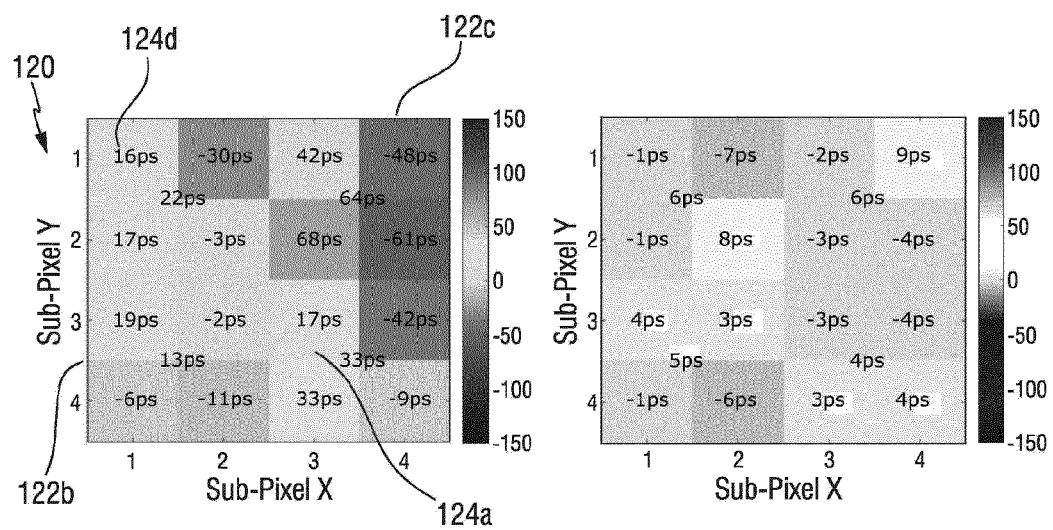
FIG. 12 shows color maps of PD sub-pixel time skews estimates from a Na-22 scan in singles mode for a 2×2 PD pixel matrix before (left) and after (right) correction.

FIG. 12 shows color maps of PD sub-pixel time skews estimates from a Na-22 scan in singles mode for a 2×2 PD pixel matrix before (left) and after (right) correction. The example with a Na-22 point source is mainly for illustration to show that sub-pixel skew calibration based on 511 keV single gamma photons emitted by a Na-22 point source basically gives the same results as lutetium based estimates when selecting corresponding energies.

In difference to the Na-22 in singles mode, a calibration source has to be placed in a predefined position (like Field of view (FOV) of the gamma ray detector), and a system based processing of coincident events is required to determine PD pixel and PD sub-pixel time skew estimates for a coincidence based calibration method.

Figure 13:
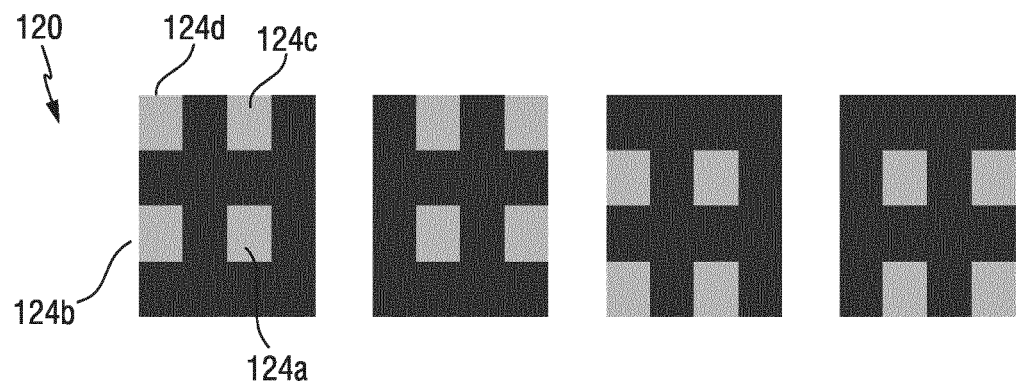
FIG. 13 shows a schematic diagram of a top view of different coincidence test patterns of enabled and disabled PD sub-pixels.

FIG. 13 shows a schematic diagram of a top view of different coincidence test patterns of enabled and disabled PD sub-pixels. As the Na-22 point source is operated in coincidence mode, the patterns have to permutated to form 4×4-=16 pattern combinations, while according to the test pattern on the far left of FIG. 13, the first PD sub-pixel 124a, a second PD sub-pixel, a third PD sub-pixel 124c and the fourth PD sub-pixel 124d are enabled. Thus, a complete set of 16 test pattern combinations may be formed, wherein one pattern is formed for each coincident side. In said context, "coincidence mode" means that two coincident 511 keV are detected and processed. The resulting energy peaks for 511 keV have a gain of $¼^{th}$ of the energy peak if only one PD sub-pixel is selected compared to fully enabled PD pixels. As the procedure does not require an light sharing between adjacent scintillator crystals here, it can be seen as the "gold standard".

Figure 14:
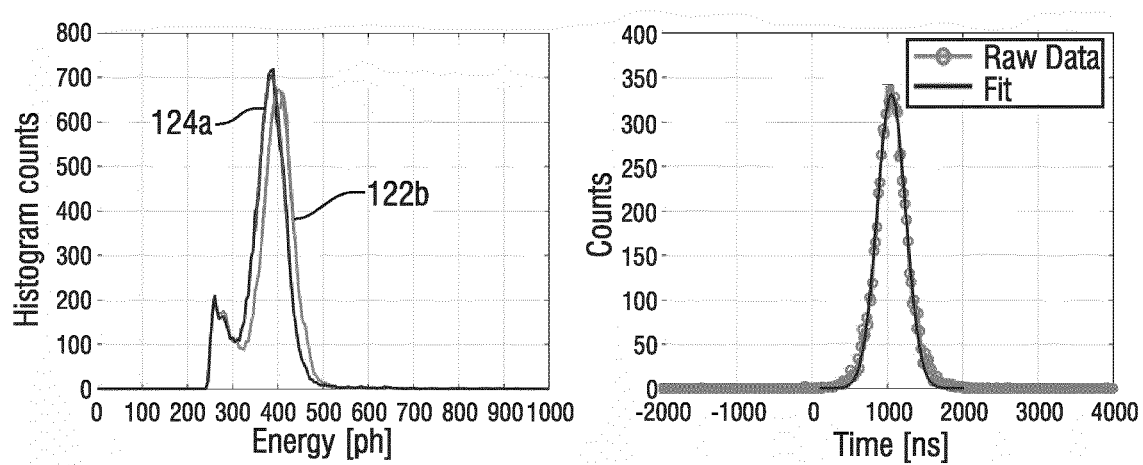
FIG. 14 shows an energy histogram and a timing histogram for a PD sub-pixel skew calibration with a Na-22 point source in coincidence mode.

FIG. 14 shows a corresponding energy histogram and a timing histogram for a sub-pixel skew calibration with a Na-22 point source in coincidence mode. This may be obtained for a PD sub-pixel test pattern in coincidence mode with only one out of four PD sub-pixels per PD pixel being enabled (cf. FIG. 13). Exemplarily, the curves may belong to the enabled first PD sub-pixel 124a and the enabled second PD sub-pixel.

Figure 15:
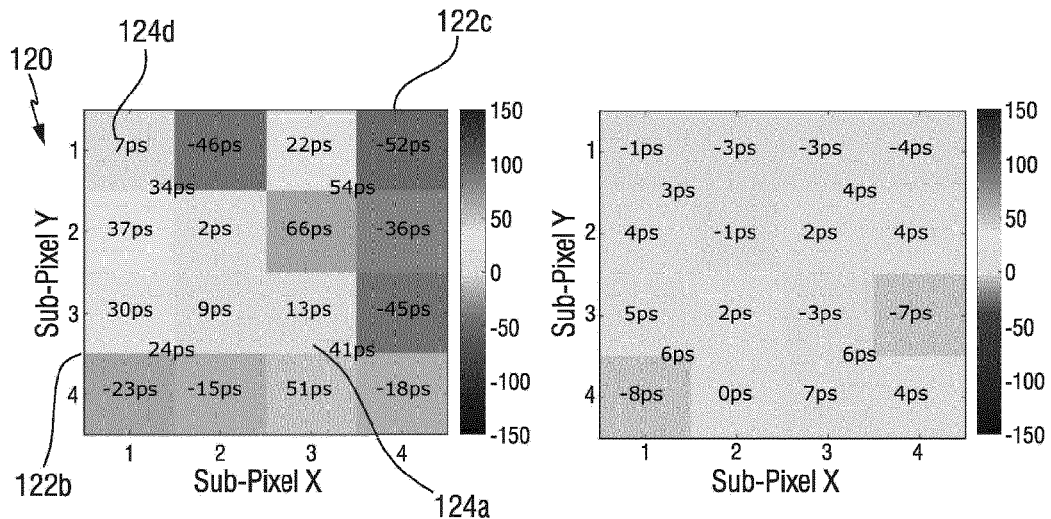
FIG. 15 shows color maps of PD sub-pixel time skews estimates from a Na-22 scan in coincidence mode for a 2×2 PD pixel matrix before (left) and after (right) correction.

FIG. 15 shows corresponding color maps of PD sub-pixel time skews estimates from a Na-22 scan in coincidence mode for a 2×2 PD pixel matrix before (left) and after (right) correction. The coincidence measurement can be used to acquire a reference global time skew map, including module skews, tile skews, PD pixel skews and PD sub-pixel skews A mapping matrix between PD sub-pixel skews and PD pixel skews estimated from the coincidence mode and the lutetium background scan can be generated to scale subsequent measurements from lutetium background.

Figure 16:
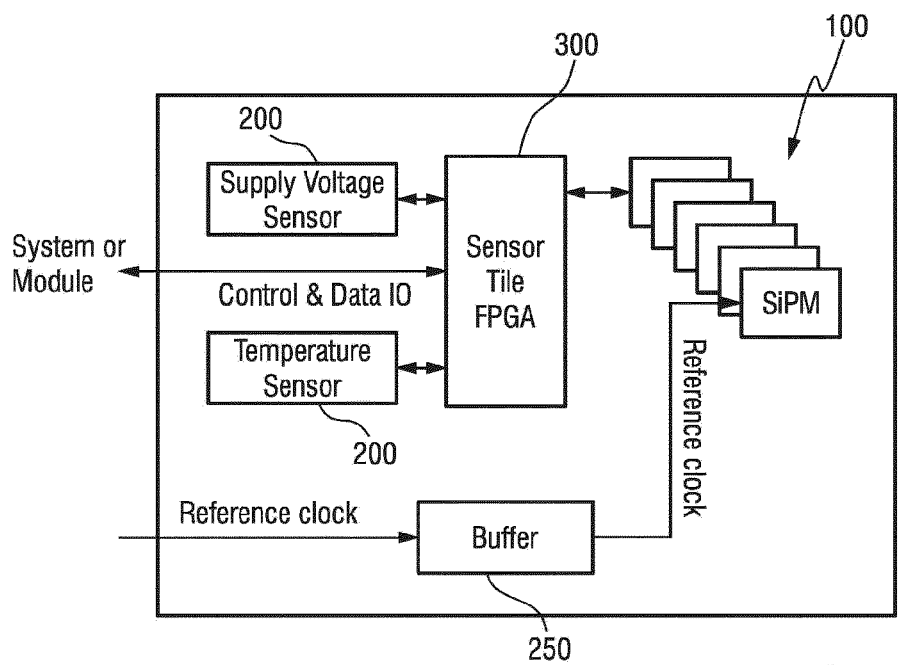
FIG. 16 shows a schematic diagram of a sensor tile with autonomous time skew correction where the control loop is realized within a tile FPGA.

FIG. 16 shows a schematic diagram of a sensor tile 300 with autonomous time skew correction where the control loop is realized within a tile FPGA. In said context the sensor tile 300 comprises several sensor dies on a printed circuit board with FPGA and other infrastructure on the backside. Every sensor die has four PD pixels and every PD pixel has four PD sub-pixels as shown, e.g., in FIG. 2C.

The present invention may comprise a feedback loop to identify and correct for tile based time offsets. This can be seen in FIG. 16, where sensors 200 are used to provide environmental data. The PD sub-pixel time skews additionally depend on external factors, like supply voltage and temperature changes. Hence, the calibration method may further include the step of correcting the time skews by setting delay times based on said environmental data, such as supply voltage or temperature. This may be done by reading the environmental data obtained from the sensors 200 and applying model based time skew correction based on these environmental data. Hence, the control loop may also identify and correct for tile based time offsets, which are normally temperature dependent, as well as voltage dependent and can originate from a buffer 250 of a reference block.

Figure 17:
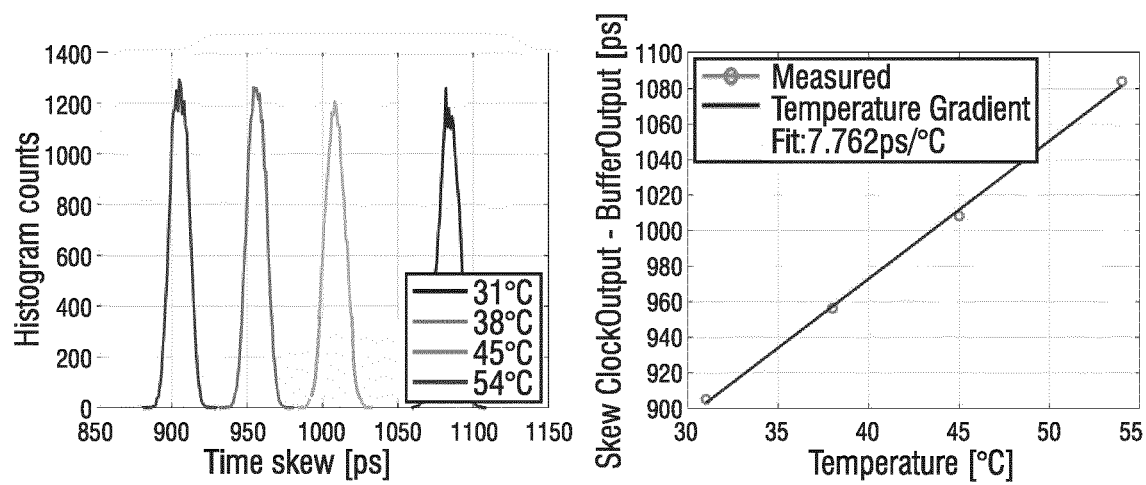
FIG. 17 shows diagrams illustrating the influence of temperature on time skew.

FIG. 17 shows diagrams illustrating the influence of temperature on the time skew. The left diagram illustrates how the time skew shifts from roughly 900 ps to larger values of roughly 1080 ps by increasing the temperature from 31° C. to 54° C. The right diagram illustrates that for this example, a linear model with 7.7 ps/K can be used for correction of the time skews. For many applications, it is important to use these models for correcting the time skew. Especially air cooled PET systems with potential variations over 10 K may, have a time skew shift of 77 ps within the detector ring, which would deteriorate timing performance notably.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for calibrating a gamma ray detector, the detector comprising: a pixelated scintillator array having multiple scintillator pixels for emitting scintillation photons at photo conversion positions in response to incident gamma rays, and a pixelated photodetector, PD, array having multiple PD pixels coupled to the pixelated scintillator array for determining a spatial intensity distribution of the scintillation photons, wherein the PD pixels are subdivided into multiple PD sub-pixels, wherein the method for calibrating comprises:

enabling a first PD sub-pixel which is coupled to a first scintillator pixel of the pixelated scintillator array, enabling a second PD pixel which is coupled to a second scintillator pixel of the pixelated scintillator array, wherein the enabled second PD pixel is located adjacent to a PD pixel to which the enabled first PD sub-pixel belongs, recording scintillation photons, emitted at a photo conversion position located in the first scintillator pixel, by the enabled first PD sub-pixel to obtain a first PD sub-pixel detection signal at a first time point, recording shared scintillation photons, resulting from the photo conversion in the first scintillator pixel and travelled into the second scintillator pixel, by the enabled second PD pixel to obtain a second PD pixel detection signal at a second time point, estimating a first time skew between the first time point and the second time point, and correcting the first time skew.

2. The method according to claim 1, wherein the correcting the first time skew comprises delaying the first PD sub-pixel detection signal and/or the second PD pixel detection signal to reduce the first time skew.

3. The method according to claim 2, wherein the pixelated PD array is connected to a tunable delay unit array of tunable PD sub-pixel delay units (134) and tunable PD pixel delay units, and wherein the calibration method comprises setting delay times for a first tunable PD sub-pixel delay unit connected to the first PD sub-pixel and for a second tunable PD pixel delay units connected to the second PD pixel to correct the first time skew.

4. The method according to claim 3, further comprising reading environmental data from at least one sensor to correct the first time skew by setting the delay times based on said environmental data.

5. The method according to claim 4, wherein the environmental data include one or more of temperature, supply voltage of the second PD pixel or first PD sub-pixel or magnetic field, and wherein the first time skew is corrected based on a time skew model which relates the environmental data with a time offset used for correcting the first time skew.

6. The method according to claim 1, wherein the PD pixels are connected to respective PD pixel triggers and the PD sub-pixels are connected to respective PD sub-pixel triggers, wherein the calibration method further comprises enabling several PD sub-pixels and several PD pixels by their respective PD sub-pixel triggers and PD pixel triggers to form a predetermined pattern of enabled and disabled PD sub-pixels and PD pixels.

7. The method according to claim 6, further comprising switching between several predetermined patterns of enabled and disabled PD sub-pixels and PD pixels, wherein the method is executed for each predetermined pattern.

8. The method according to claim 7, further comprising:

enabling a third PD pixel which is coupled to a third scintillator pixel of the pixelated scintillator array, wherein the enabled third PD pixel is located adjacent to the PD pixel to which the enabled first PD sub-pixel belongs, recording shared scintillation photons, resulting from the photo conversion in the first scintillator pixel and travelled into the third scintillator pixel, by the enabled third PD pixel to obtain a third PD pixel detection signal at a third time point, estimating a second time skew between the third time point and the first time point, and averaging the first time skew and the second time skew to obtain an averaged time skew.

9. The method according to claim 1, further comprising:
emitting incident gamma rays by a point source distanced from the gamma ray detector and/or by radioactive nuclides if the pixelated scintillator array comprises radioactive nuclides, wherein the scintillation photons are emitted at photo conversion positions in response to said incident gamma rays.

10. The method according to claim 1, further comprising the steps of
comparing the estimated first time skew, second time skew and/or averaged time skew to a reference table of time skews, and
generating a warning if the estimated time skew is outside an acceptance window.

11. A calibration module for a gamma ray detector that comprises a pixelated scintillator array having multiple scintillator pixels configured to emit scintillation photons at photo conversion positions in response to incident gamma rays, a pixelated PD array having multiple PD pixels coupled to the pixelated scintillator array and configured to determine a spatial intensity distribution of the scintillation photons, wherein the PD pixels are subdivided into multiple PD sub-pixels,
the calibration module comprising:
a recorder configured to:
record scintillation photons, emitted at a photo conversion position in a first scintillator pixel of the pixelated scintillator array, by an enabled first PD sub-pixel which is coupled to the first scintillator pixel, to obtain a first PD sub-pixel detection signal at a first time point, and
record shared scintillation photons, resulting from the photo conversion in the first scintillator pixel and travelled into a second scintillator pixel of the pixelated scintillator array, by an enabled second PD pixel which is coupled to the second scintillator pixel and located adjacent to a PD pixel to which the enabled first PD sub-pixel belongs to obtain a second PD pixel detection signal at a second time point, and
a processing module configured to estimate a first time skew between the first time point and the second time point, and correct the first time skew.

12. A gamma ray detector comprising:
a pixelated scintillator array having multiple scintillator pixels configured to emit scintillation photons at photo conversion positions in response to incident gamma rays,
a pixelated PD array having multiple PD pixels coupled to the pixelated scintillator array and configured to determine a spatial intensity distribution of the scintillation photons, wherein the PD pixels are subdivided into multiple PD sub-pixels, and
a calibration module according to claim 11.

13. A medical imaging device comprising the gamma ray detector according to claim 12.

14. A tangible, non-transitory computer readable medium that stores instructions, which when executed by a processor, causes the processor to:
enable a first PD sub-pixel, which is coupled to a first scintillator pixel of a pixelated scintillator array;

enable a second PD pixel which is coupled to a second scintillator pixel of the pixelated scintillator array, wherein the enabled second PD pixel is disposed adjacent to a PD pixel to which the enabled first PD sub-pixel belongs;
record scintillation photons emitted at a photo conversion position located in the first scintillator pixel, by the enabled first PD sub-pixel to obtain a first PD sub-pixel detection signal at a first time point;
record shared scintillation photons, resulting from the photo conversion in the first scintillator pixel and travelled into the second scintillator pixel, by the enabled second PD pixel to obtain a second PD pixel detection signal at a second time point;
estimate a first time skew between the first time point and the second time point; and
correct the first time skew.

15. The tangible, non-transitory computer readable medium according to claim 14, wherein the processor corrects the first time skew by delaying the first PD sub-pixel detection signal and/or the second PD pixel detection signal to reduce the first time skew.

16. The tangible, non-transitory computer readable medium according to according to claim 15,
wherein a pixelated PD array is connected to a tunable delay unit array of tunable PD sub-pixel delay units and tunable PD pixel delay units, and
wherein the instructions, when executed by the processor is further configured to set delay times for a first tunable PD sub-pixel delay unit connected to the first PD sub-pixel and for a second tunable PD pixel delay units connected to the second PD pixel to correct the first time skew.

17. The tangible, non-transitory computer readable medium according to claim 16,
wherein the instructions, when executed by the processor further cause the processor to read environmental data from at least one sensor to correct the first time skew by setting the delay times based on said environmental data.

18. The tangible, non-transitory computer readable medium according to claim according to claim 17,
wherein the environmental data include one or more of temperature, supply voltage of the second PD pixel or first PD sub-pixel or magnetic field, and
wherein the first time skew is corrected based on a time skew model which relates the environmental data with a time offset used for correcting the first time skew.

19. The tangible, non-transitory computer readable medium according to claim 14,
wherein the PD pixels are connected to respective PD pixel triggers and the PD sub-pixels are connected to respective PD sub-pixel triggers, and
wherein the instructions further cause the processor to enable several PD sub-pixels and several PD pixels by their respective PD sub-pixel triggers and PD pixel triggers to form a predetermined pattern of enabled and disabled PD sub-pixels and PD pixels.

20. The tangible, non-transitory computer readable medium according to claim according to claim 19, wherein the instructions, when executed by the processor further cause the processor to switch between several predetermined patterns of enabled and disabled PD sub-pixels and PD pixels, wherein instructions are executed for each predetermined pattern.

* * * * *